United States Patent
Gibbs et al.

(10) Patent No.: US 6,182,816 B1
(45) Date of Patent: Feb. 6, 2001

(54) SCRAPER BLADE FOR CONVEYORS

(75) Inventors: A. Todd Gibbs, Allentown; George T. Mott, Alburtis, both of PA (US)

(73) Assignee: Asgco Manufacturing, Inc., Allentown, PA (US)

(*) Notice: Under 35 U.S.C. 154(b), the term of this patent shall be extended for 0 days.

(21) Appl. No.: 09/223,358

(22) Filed: Dec. 30, 1998

Related U.S. Application Data

(63) Continuation-in-part of application No. PCT/US97/15082, filed on Aug. 20, 1997.
(60) Provisional application No. 60/024,928, filed on Aug. 30, 1996.

(51) Int. Cl.$^7$ ............................................... B65G 45/00
(52) U.S. Cl. ................................................. 198/497
(58) Field of Search .................................. 198/497, 499

(56) References Cited

U.S. PATENT DOCUMENTS

| | | |
|---|---|---|
| D. 347,918 | 6/1994 | Gibbs . |
| 4,825,996 | 5/1989 | Davidts . |
| 4,962,845 | 10/1990 | Gibbs . |
| 5,011,002 | 4/1991 | Gibbs . |
| 5,016,746 | 5/1991 | Gibbs . |
| 5,114,000 | 5/1992 | Rappen . |
| 5,197,587 | 3/1993 | Malmberg . |
| 5,222,589 | 6/1993 | Gordon . |
| 5,573,102 | * 11/1996 | Puchalla ............................ 198/497 |
| 5,865,294 | * 2/1999 | Betz ................................... 198/497 |

FOREIGN PATENT DOCUMENTS 2221440    2/1990   (GB) .

* cited by examiner

Primary Examiner—Christopher P. Ellis
Assistant Examiner—Khoi H. Tran
(74) Attorney, Agent, or Firm—Dann, Dorfman, Herrell and Skillman; Stephen H. Eland

(57) ABSTRACT

An improved blade for a scraper assembly used with the head pulley of a conveyor system. The improved conveyor blade has a metal base adapted to telescopically engage a rectangular plate projecting radially from a support shaft mounted for rotation about a rotary axis parallel to the head pulley axis, the metal base having sheet-like outer walls disposed in spaced parallel relation from a receptacle for the elastomeric body of the blade. The blade has an under surface confronting the head pulley which projects past the plane of the innermost wall of the metallic base and terminates in a tip engaging the belt on the head pulley.

9 Claims, 1 Drawing Sheet

SCRAPER BLADE FOR CONVEYORS

This Appln is a cont-in-part of PCT/US97/15082 filed Aug. 20, 1997 and also claims the benefit of U.S. Provisional No. 60/024,928 filed Aug. 30, 1996.

FIELD OF THE INVENTION

The present invention relates to conveyor systems and is particularly applicable to a novel scraper adapted to bear against a head pulley to scrape the material from the belt as it travels around the head pulley. The invention has particular application to conveyors for conveying wet materials which tend to adhere to the conveyor belt.

BACKGROUND OF THE INVENTION

Conventional belt conveyors typically have a plurality of scraper assemblies disposed to remove deposits adhering to the surface of the conveyor belt. For example, it is common to provide a scraper assembly at or near the head pulley to clean the belt as the belt begins its return travel. Additionally, trailing arm scrapers are commonly located along the length of the belt in between the head and tail pulleys to provide additional cleaning.

A common type of scraper blade assembly comprises a plurality of mounted scraper blades extending across the transverse axis of the conveyor belt. The blades are mounted on support arms which are fixed to and extend from a transverse rotatable support shaft. Rotation of the transverse support shaft moves the scraper blades into and out of contact with the conveyor belt. Applying a torque to the support shaft increases the contacting force of the scraper blades against the belt.

During installation and use of the scraper blade assemblies, the belt scraper blades wear down.

A high durometer polyurethane scraping blade will not wear as quickly as a lower durometer blade, but the higher durometer blade will impart greater stress to the conveyor belt and it is more likely to damage poorly-made splices in the conveyor belt, and is less able to adapt itself to conform to the contour of the belt as it wears.

Where it is desirable to provide more flex in the scraper blade, it is desirable to use a 82–85 durometer blade which has a thickness of 1¼" or less. When conventional blades of the prior art are used, the thickness of the blade gradually increases from the tip all the way back to the mounting base, and the greatest flexibility is at the tip where the blade sharply tapers to a relatively sharp edge along its length. After the blade wears through the sharply-tapered tip, the conventional blade loses its high flexibility.

With wet and sticky materials or materials which accumulate due to freezing or evaporation, the scraper blade tends to accumulate materials scraped from the belt on the under surface of the blade which confronts the belt. If the material accumulated on the blade builds up to a substantial degree, it cakes on the under surface and may engage the belt downstream from the scraping edge of the blade and cause the scraping edge to disengage the surface of the belt, or may serve as a dam or block against the bias of the blade holder forcing the scraping edge of the blade against the belt to take advantage of the flexible nature of the blade.

SUMMARY OF THE INVENTION

With the foregoing in the mind, the present invention provides a novel blade design which overcomes the deficiencies of the prior art blades.

More specifically, the present invention provides a blade configuration which enables the under surface of the blade to confront the belt at an angle which is sufficiently steep to allow some accumulation of material on the under surface of the blade without building up a cake which is large enough to displace the blade away from the belt.

In a preferred embodiment, the blade has a base adapted to be replaceably mounted on a support shaft which is operable to rotate the blade against the conveyor belt with a pressure bias, and the under surface of the blade extending from the base to the scraping edge is recessed.

Specifically, the preferred blade has a metallic base portion adapted to be releasably engaged on the support shaft with a resilient blade molded integrally with the metallic support base. The blade is formed of an elastomeric material such as plastic, capable of resiliently flexing to conform to the contour of the conveyor belt as it traverses past the blade on the head pulley. The resilience of the elastomeric material assists the dislodgment of material accumulated on the blade during operation. The elastomeric blade is offset adjacent the metal base so as to provide a straight under surface confronting the head pulley throughout the wear portion of the blade.

BRIEF DESCRIPTION OF THE DRAWINGS

The invention will be described more fully hereinafter with reference to the accompanying drawings, wherein.

DESCRIPTION OF THE PREFERRED EMBODIMENTS

Figure 1:
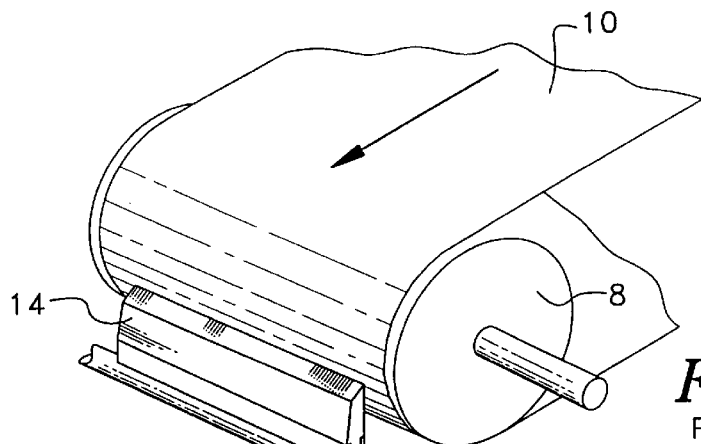
FIG. 1 illustrates a prior art conveyor system having a support shaft mounting a blade for separating the conveyed material from the conveyor belt as it is entrained around a head pulley.

As shown in the prior art conveyor assembly, a conveyor belt 10 is trained around a head pulley 8. A scraper blade 14 is pivotally mounted for rotation with a support shaft 20. As shown, the blade 14 comprises a plastic body 23 mounted in a metallic base 21 which engages over and is supported by a support arm 22 which comprises a metallic plate extending radially outward from the support shaft 20 on a side which confronts the head pulley 8. A suitable tensioning device (not shown) operates to provide an angular bias tending to rotate the support shaft 20 towards the head pulley so as to apply a pressure biasing the blade 14 into engagement with the pulley.

In normal operation, the plastic body 23 of the blade 14 flexes to conform to the contour of the conveyor belt 10 as it is traversed past the blade by the head pulley 18. Any material adhering to the belt is dislodged by the scraper blade 14. The body of the blade 14 is sufficiently long to permit substantial wearing down of the body during operation of the conveyor, and normally the blade is allowed to wear down until the blade allows disengagement of the blade from the belt on the pulley, or until the metallic base 21 of the blade is exposed sufficiently to contact the conveyor belt or the material.

The base 21 provides a rigid support for the blade on the plate 22 which extends radially from the shaft 20 on a side of the shaft which confronts the head pulley. The base 21 has four parallel side walls, the first and fourth walls (the outer side walls) 15 and 16 are open at the top to receive the elastomeric material of the blade member 23 and are connected at the bottom to the second and third walls (the internal side walls) 17 and 18. Internal side walls 17 and 18 are connected at their top at a location intermediate the tops and bottoms of the side walls 15 so as to form a generally W-shaped cross-section forming a hollow slot 19 at the bottom to telescopically engage the plate 22. The first and fourth side walls 15 and 16 are spaced apart to provide a receptacle for the body member 23 of the blade. At the bottom, the body member engages in the receptacle formed between the outer walls 15 and 16 and has an under surface 25 confronting the head pulley and an outer surface facing away from the head pulley. The outer surface 28a and 28b extends upwardly from the first wall 15 and the undersurface 25 extends upwardly from the fourth wall 16. The thickness of the body member 23 corresponds to the spacing between the side walls 15 and 16 at the bottom of the body member and the thickness diminishes from the base 21 toward the top where the body member 23 terminates in a blade tip 27.

When handling wet materials which tend to adhere to the conveyor belt, there is a tendency for the wet material, as it is scraped from the belt surface, to adhere to the tip of the blade, both on the outer face and along the under surface. Depending on the character of the wet material, the material adhering to the blade may tend to build up on the under surface of the blade adjacent the scraping tip. When this occurs, the accumulation of the material on the under surface of the blade may tend to cause the scraping edge to disengage the surface of the belt, or may serve as a dam or block against the bias of the blade holder 22 forcing the scraping edge of the blade against the belt.

With the foregoing mind, the present invention provides an improved scraper blade which overcomes the problems described above. Specifically, the improved scraper blade of the present invention is designed to replace the conventional blade 14 shown in FIG. 1. FIGS. 2–5 illustrate different configurations of the scraper blade which overcome the problem of build-up on the under surface of the blade. To this end, the blades shown in FIGS. 2–5 each comprise a metallic base member and a body member formed of an elastomeric material such as plastic. The body member of each scraper is capable of resiliently flexing to conform to the contour of the conveyor belt as the conveyor belt traverses past the scraper blade on the head pulley. This resilient flexing aids in breaking up the build-up of material that may accumulate on the back of the blade.

Figures 2, 3, 4, 5:
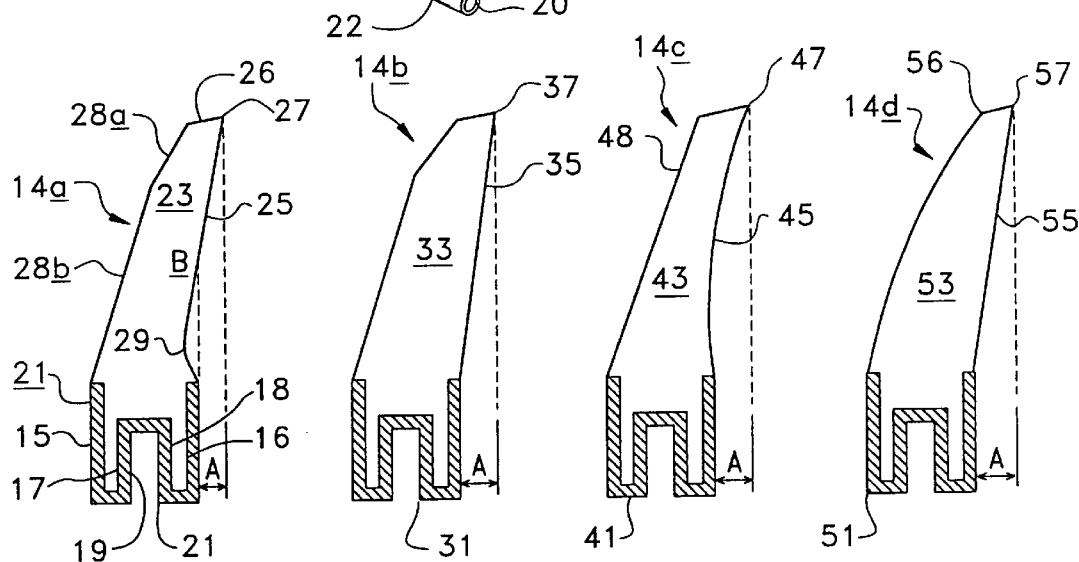
FIGS. 2, 3, 4 and 5 are end views illustrating novel blade configurations for use as replacements of the blade shown in FIG. 1.

In FIG. 2, the base member of the blade 14a is designated with the reference character 21, and the body member is designated with the reference character 23. In FIG. 3, the base and body members of the blade 14b are designated as 31 and 33, respectively. In FIG. 4, the base and body members of the blade 14c are designated 41 and 43, respectively, and in FIG. 5, the base and body members of the blade 14d are designated 51 and 53, respectively.

FIG. 2 illustrates the preferred embodiment in which the body member 23 has a flat under surface 25 which confronts the conveyor belt 10 on the pulley 8. At its upper end, the under surface 25 merges with an angular tip surface 26 to provide a shearing edge 27 extending along the length of the body portion of the blade. The outer surface of the blade has an intermediate surface 28a which extends angularly rearwardly as indicated at a more shallow angle than the surface tip 26 and then the outer surface 28 extends at a less steep angle to the base 21. The base 21 has a hollow slot 19 which telescopically engages the holder 22 so as to be removable when the blade wears and needs replacement.

The under surface 25 is disposed at an angle to the center line of the base 21 and the holder 22 so as to provide an angle which is sufficiently steep to allow some accumulation of material on the under surface of the blade without building up a cake which is large enough to displace the blade away from the belt. The angular disposition of the under surface 25 relative to the belt 10 on the head pulley 18 provides a clearance space which may accommodate a substantial build-up of material. In addition, the tip 27 projects outwardly from the plane edge of the fourth wall 16 to provide a tip offset, which is designated "A". In the present instance, the tip offset "A" is approximately ½–¾ inches (1.25–1.90 cm). A corresponding tip offset is also labeled A in each of FIGS. 3–5. The tip offset A provides additional clearance space which may accommodate a build-up of material.

In the preferred embodiment of FIG. 2, the flat under surface 25 has an angle which is sufficiently steep so that its projected continuation intersects with the base 21 between the walls 15 and 16, to provide a base offset. To reduce the build-up of wet material in the base offset, the base 21 is embedded in the body 23 so that the plastic material of the body portion forms a fillet 29 between the inward edge of the base 21 and the flat surface 25. In the present instance, the fillet 29 merges with the inner surface 25 at a point that is approximately coplanar with the plane of the fourth wall 16 of the base as designated by point B in FIG. 2. In this way, after the scraper tip 27 has worn down to point B so that there is no longer a tip offset A, the fillet 29 functions as an offset to provide clearance for some build-up of wet material.

In the embodiment shown in FIG. 3, the flat surface 35 extends from the scraping tip 37 to the top of the inside edge of the base 31 without having a base offset. In other respects, the body 33 is comparable to the body 23.

FIG. 4 is a similar blade in which the body portion 43 has an arcuate under surface 45 from the scraping tip 47 to the base 41. At the tip, the tip surface 46 which meets the arcuate surface 45 to form the scraping tip is similar to the surface 26 of the embodiment of FIG. 2, but the rear wall 48 extends in a straight plane from the rear of the tip surface 46 to the rear edge of the base 41 without an intermediate surface.

FIG. 5 is a blade similar to FIG. 4 having a tip surface 56 merging with a flat under surface 55 to provide a scraping edge 57. The rear surface of the blade is arcuate from the angular surface 56 to the rear surface of the base 51.

The blade of FIG. 2 is deemed preferable for most materials, but for certain materials, it may be found desirable to utilize blades such as shown in FIGS. 3–5.

Figures 6, 7, 8:
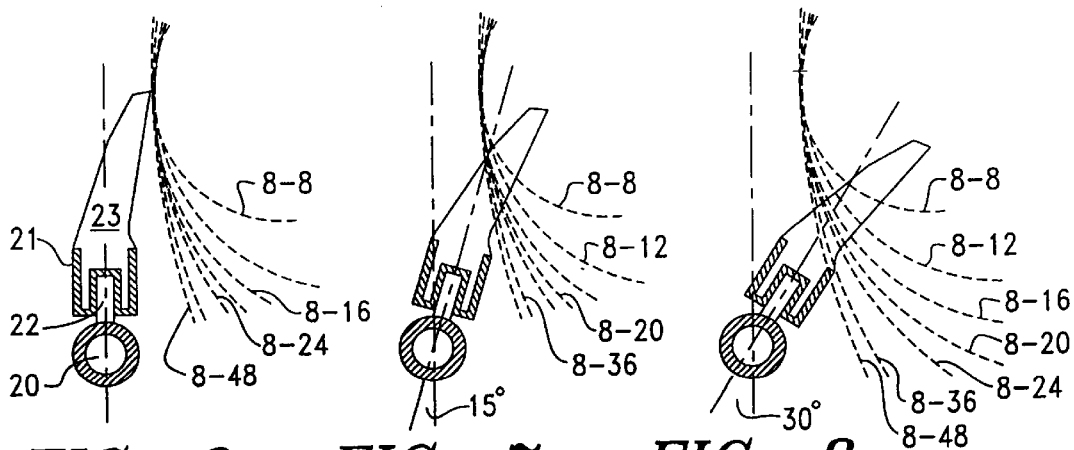
FIGS. 6, 7 and 8 are diagrammatic views illustrating the angular movement of the support shaft as the blade wears during use, the figures showing the blade of FIG. 2 as it wears down by engagement with the conveyor belts on head pulleys of differing diameters.

FIGS. 6, 7 and 8 illustrate the angular displacement of the blade shown in FIG. 2 as it wears down in use. As shown in these figures, the support shaft 20 with the blade holder 22 rotates under the bias provided for the shaft 20, and the position of the blade at 15° and 30° rotation are shown in FIGS. 7 and 8. With a small diameter head pulley as indicated at 8—8, the blade may wear down the full 30°, but with the small diameter pulley, there is a tendency for the blade to flip past the pulley at the 30° angle. For larger diameter pulleys, this problem does not arise, but as the pulley gets larger, the likelihood of the metallic base 21 being displaced against the belt on the pulley arises, and it will require replacement of the blade more quickly than in the case of the pulleys of intermediate size.

The flexibility of the blade varies based on several factors including the material used to form the blade, and the thickness of the blade between the under surface 25 and the outer surface 28. It should be noted that the under surface 25 is substantially parallel to the outer surface 28b, so that the resilient flexibility of the blade is not substantially reduced as the blade wears down, as shown in FIGS. 6–8. Preferably, the durometer of the blade is in the range of 82–85 durometer and the thickness of the blade between the under surface and the back surface is less than approximately 1¼ inch (3.2 cm). In many conventional blades, the blade thickness increases as the blade wears, so that the blade thickness increases to above approximately 1¼ inch (3.2 cm) for a substantial portion of the wear-life of the scraper blade. However, in the embodiment of FIG. 2, by providing the base offset, the blade thickness remains below the limit until the blade is worn down to within approximately ¾ inch (1.90 cm) from the metallic support in the base of the blade. Therefore, the flexibility of the scraper blade is maintained within a preferred range during a greater portion of the wear-life of the scraper blade.

Preferably, the body member of the blade is molded in the desired shape. The base is mounted in the mold during the molding operation so that the metallic base of the blade forms a reinforcing shield at the bottom of the molded blade and provides a rigid interconnection for the blade on the blade holder 22 of the shaft 20.

While particular embodiments of the invention have been herein illustrated and described, it is not intended to limit the invention to such disclosures, but changes and modifications may be made therein and thereto within the scope of the following claims.

What is claimed is:

1. For a belt conveyor having a belt for conveying material deposited on the belt, a head pulley about which said belt is trained, said head pulley mounted for rotation about a rotary axis, and a scraper assembly near the head pulley to clean the belt as the belt begins its return travel, said scraper assembly including a support shaft rotatable about an axis parallel to the head pulley axis and spaced therefrom, said support shaft having a blade holder, said shaft being biased to rotate said blade holder toward the head pulley;

said scraper assembly including an improved blade adapted to be mounted on said support shaft by telescopic engagement with said blade holder;

said improved blade comprising a base and a body member formed of an elastomeric material, said elastomeric material being capable of resiliently flexing;

said base having four parallel sheet-like walls forming a generally W-shaped cross section, the first and fourth of said walls being the outer walls of the base and being open at the top to enclose the elastomeric material of said body member therebetween, the second and third of said walls being internal walls, the bottom of each of said outer walls being connected with an adjacent internal wall, said internal walls extending toward the top of said base and being interconnected at a location between the bottoms and the tops of the outer walls to provide a slot, said slot having a depth determined by the height of said internal walls less than the height of the outer walls and being dimensioned for engagement with said blade holder;

said elastomeric body member having a bottom portion anchored in said base between the outer walls thereof and extending upwardly therefrom;

said elastomeric body member having an under surface adapted to confront the head pulley and an opposite outer surface facing away from said pulley, said outer surface extending upwardly from the first of said walls of the base to a blade tip, said under surface extending upwardly from the fourth of said walls to the blade tip, the thickness of said elastomeric body member between said outer and under surfaces diminishing from the base to the tip, said surfaces extending respectively at their bottom ends from the first and second outer walls, the distance between said under surface and said outer surface at said base being equal to the spacing between said outer walls of said base; and the sender surface of said blade being adapted to confront the head pulley and being inclined toward the head pulley from said fourth wall of the base so as to project into the space between said head pulley and said shaft, said outer and under surfaces converging toward the top to terminate in said scraping tip, wherein the fourth wall of said base defines a plane spaced outwardly from the belt and the under surface of the blade member extends upwardly from the fourth wall and inwardly toward said belt and beyond said plane.

2. An improved blade according to claim 1 wherein said under surface has a fillet adjoining the fourth wall projecting outwardly beyond said plane.

3. An improved blade according to claim 2 wherein said under surface is flat from said tip to said fillet, said body member being of substantially uniform thickness upwardly for a substantial distance from said fillet.

4. An improved blade according to claim 1 wherein said under surface is flat from said tip to said fourth wall.

5. An improved blade according to claim 1 wherein said under surface is flat from said tip to said fourth wall.

6. An improved blade according to claim 1 wherein said under surface has a uniform arcuate curvature from said tip to said fourth wall, said curvature being tangent to the plane of said fourth wall.

7. An improved blade according to claim 1 wherein said under surface has a uniform arcuate curvature from said tip to said fourth wall, said curvature being tangent to the plane of said fourth wall.

8. An improved blade according to claim 1 wherein said outer surface of the blade member has a tip surface at its top and disposed at a steeper angle to the plane of said fourth wall than the remainder of said outer surface.

9. An improved blade according to claim 1 wherein said outer surface of the blade member has a tip surface at its top and disposed at a steeper angle to the plane of said fourth wall than the remainder of said outer surface.

* * * * *

UNITED STATES PATENT AND TRADEMARK OFFICE
CERTIFICATE OF CORRECTION

PATENT NO. : 6,182,816 B1      Page 1 of 1
DATED : December 4, 2001
INVENTOR(S) : Gibbs et al.

It is certified that error appears in the above-identified patent and that said Letters Patent is hereby corrected as shown below:

<u>Column 6, claim 1,</u>
Line 22, "the sender" should be -- the inner --;

Signed and Sealed this

Fifth Day of March, 2002

*Attest:*

JAMES E. ROGAN
*Attesting Officer*     *Director of the United States Patent and Trademark Office*